United States Patent

Gaud et al.

[11] Patent Number: 6,163,435
[45] Date of Patent: Dec. 19, 2000

[54] VERTICAL MAGNETIC HEAD HAVING A MAGNETIC CIRCUIT WITH A NON-EMBEDDED PART AND HAVING AN INTEGRATED COIL SURROUNDING THE NON-EMBEDDED PART

[75] Inventors: Pierre Gaud, Coublevie; Henri Sibuet, Le Fontanil; Michel Di Gioia, Varces, all of France

[73] Assignee: Commissariat a l'Energie Atomique, Paris, France

[21] Appl. No.: 09/125,107

[22] PCT Filed: Feb. 14, 1997

[86] PCT No.: PCT/FR97/00284

§ 371 Date: Aug. 17, 1998

§ 102(e) Date: Aug. 17, 1998

[87] PCT Pub. No.: WO97/30442

PCT Pub. Date: Aug. 21, 1997

[30] Foreign Application Priority Data

Feb. 15, 1996 [FR] France .................................. 96 01871

[51] Int. Cl.[7] ........................................................ G11B 5/17
[52] U.S. Cl. ........................................ 360/123; 29/603.23
[58] Field of Search ......................... 360/123; 29/603.23, 29/603.24, 603.25, 603.26

[56] References Cited

U.S. PATENT DOCUMENTS

| 4,743,988 | 5/1988 | Sato et al. | 360/126 |
| 4,853,815 | 8/1989 | Diepers | 360/126 |
| 5,566,442 | 10/1996 | Gaud et al. | 360/123 |
| 5,604,973 | 2/1997 | Gaud et al. | 360/125 |
| 5,668,689 | 9/1997 | Schultz et al. | 360/113 |
| 5,883,760 | 3/1999 | Yamada et al. | 360/76 |

FOREIGN PATENT DOCUMENTS 57-058216  4/1982  Japan .

OTHER PUBLICATIONS

Thin Film Type Laminated Head, IBM Technical Disclosure Bulletin, vol. 37, No. 12, pp. 77–79, Dec. 1994.

*Primary Examiner*—Craig A. Renner
*Attorney, Agent, or Firm*—Oblon, Spivak, McClelland, Maier & Neustadt, P.C.

[57] ABSTRACT

Magnetic head for use in magnetic recording and including an integrated coil having at least one winding around a non-embedded part of the magnetic circuit. The winding includes a lower sheet of conductors placed in a chamber etched in the substrate and which is integrated into this substrate. The magnetic head is manufactured in a process including forming on a solid substrate a magnetic circuit with a first and second polar part having embedded portions positioned side by side and separated by a nonmagnetic air gap. The magnetic circuit includes at least one non-embedded bridging part no portion of which is embedded in the substrate. A conductor coil is formed around the non-embedded part of the circuit by making a lower sheet of conductors passing underneath the non-embedded bridging part and by embedding the lower sheet in at least one chamber made in the substrate, and by making an upper sheet of conductors astride the non-embedded bridging part of the magnetic circuit.

16 Claims, 14 Drawing Sheets

VERTICAL MAGNETIC HEAD HAVING A MAGNETIC CIRCUIT WITH A NON-EMBEDDED PART AND HAVING AN INTEGRATED COIL SURROUNDING THE NON-EMBEDDED PART

DESCRIPTION

1. Technical Field

The present invention relates to a vertical magnetic head with integrated coil and its manufacturing process.

It finds privileged application in video recording by the general public. But it may also be used in other areas, such as data backup or computer memories.

2. State of the Prior Art

A magnetic recording medium for video recording, data backup or computer memory comprises numerous tracks on which information is written in the form of magnetic fields.

To increase information density, not only can the amount of information per unit length be increased, but also the number of tracks. To achieve this purpose, track width is reduced and, simultaneously, the distance between them is reduced until the tracks abut one another.

To avoid any crosstalk problems on reading, the information on two adjacent tracks is written at opposite angles. The head angle must be most precise (for example 20±0.150° in the new so-called DVC standard for <<Digital Video Cassette >>).

Figure 1:
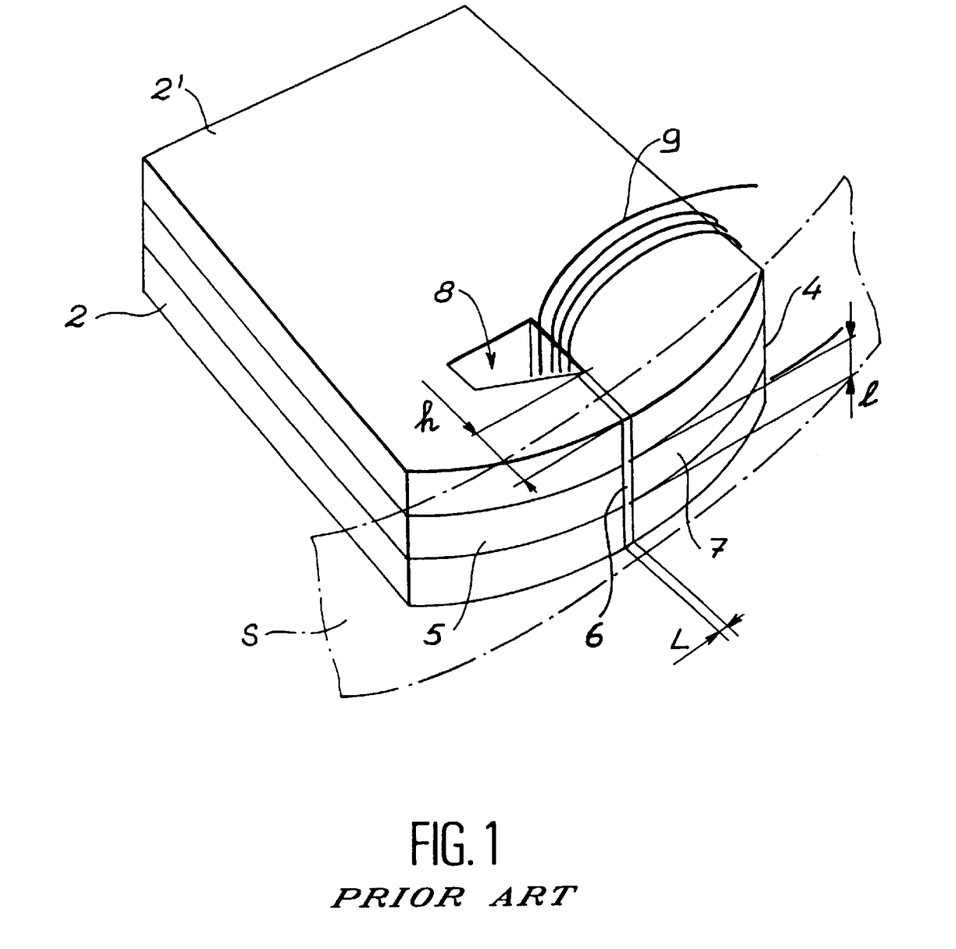
FIG. 1, already described, illustrates a known magnetic head of sandwich type.

To meet these requirements, so-called <<sandwich >> heads can be currently found on the market of which an example of embodiment is illustrated in FIG. 1 appended hereto. The head shown comprises a substrate 2 carrying a magnetic circuit 4 made up of a magnetic layer placed on the top surface of the substrate, this circuit having two polar parts 5 and 7 at the front separated by an air gap 6 which is formed by a nonmagnetic spacer. This head also comprises, above the magnetic circuit, a nonmagnetic superstrate 2'. An opening 8 is pierced through the whole unit to allow the passage of a conductor coil 9 surrounding the magnetic circuit.

The head shown in FIG. 1 is intended to co-operate with a recording medium S oriented perpendicular to the substrate (in other words parallel to the latter's edge).

Such heads may be described as <<vertical >> in the sense that the active surface is perpendicular to the general surface of the substrate.

The width of the air gap, called 1, is calculated perpendicular to the substrate (parallel to the recording medium). This width 1 substantially corresponds to the respective width of the tracks in the medium. The length of the air gap, called L, is calculated in the direction of the relative movement of the head and recording medium. The height of the air gap, called h, is calculated parallel to the surface of the substrate carrying the magnetic circuit.

As soon as track width becomes narrow (less than approximately 10 micrometers), these heads become very difficult to fabricate (problems relating to precision alignment of the two polar parts during glass welding, low efficiency due to magnetic circuit length, difficult coil production, which is an added part and cannot be adapted easily to a package production process etc.)

Figure 2:
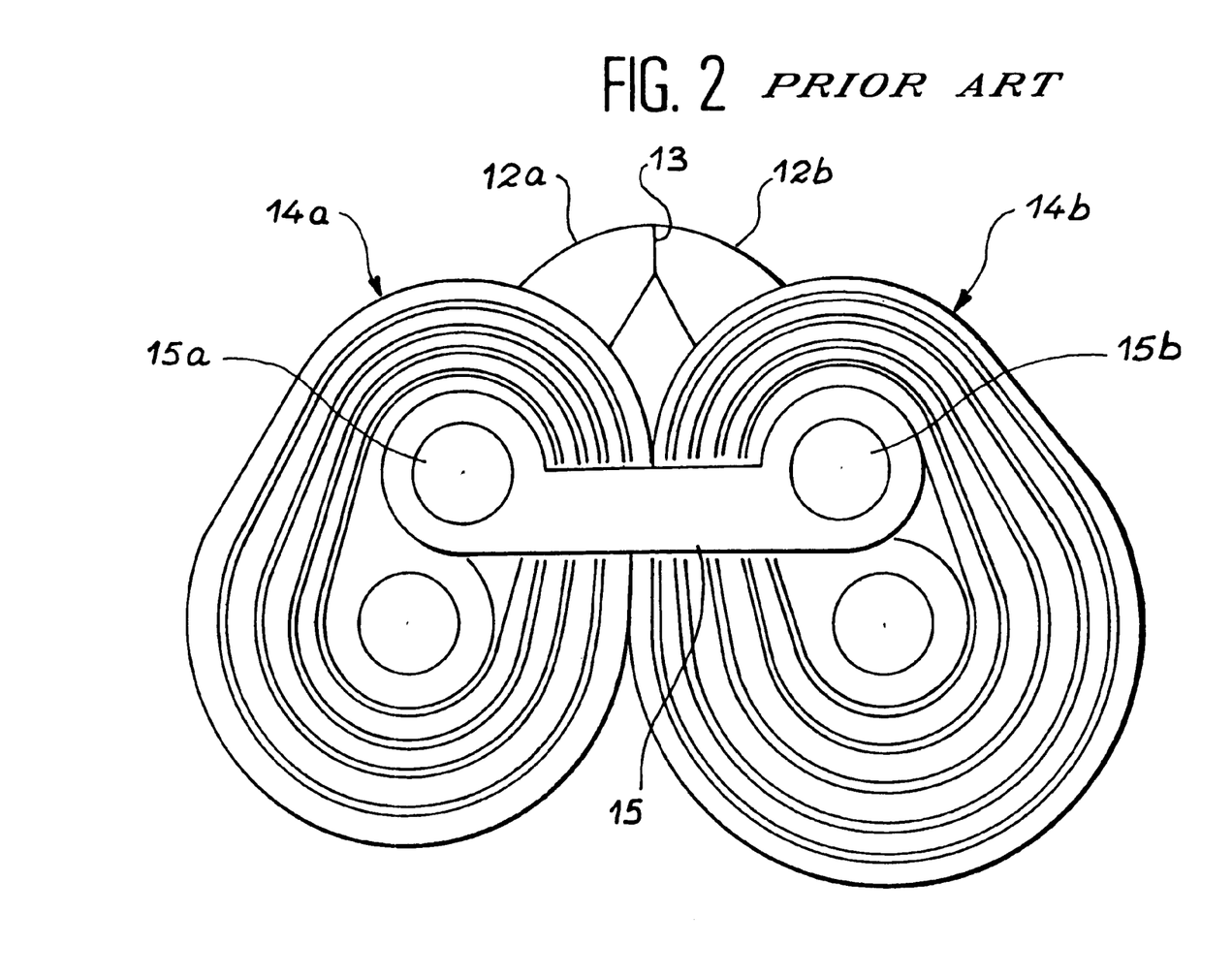
FIG. 2, already described, illustrates a known magnetic head with planar winding.

The abstract of Japanese patent, vol. 13, n°98 (P-840) (3446) of Mar. 8, 1989, describes a different magnetic head with planar coiling. This head is shown in FIG. 2 appended hereto. It comprises two polar parts 12a, 12b separated by an air gap 13, a twin spiral coil 14a, 14b placed over the two limbs of the magnetic circuit, two connection pads 15a, 15b and a magnetic bridge 15 closing the magnetic circuit.

This head still has disadvantages connected firstly with its coil structure which is long and therefore resistant producing thermal noise and, secondly with its magnetic circuit which is relatively long and therefore has reduced efficiency.

EP-A-0,467,263 discloses a head which partly avoids these drawbacks. This type of head can be seen in appended FIGS. 3 and 4. They show a nonmagnetic substrate 21, a first insulating layer 22, a second insulating layer 29, a magnetic circuit 30, a conductor coil 38 of solenoid type wound around the magnetic circuit, electric connection strips 33 and connection pads 34.

Figure 4:
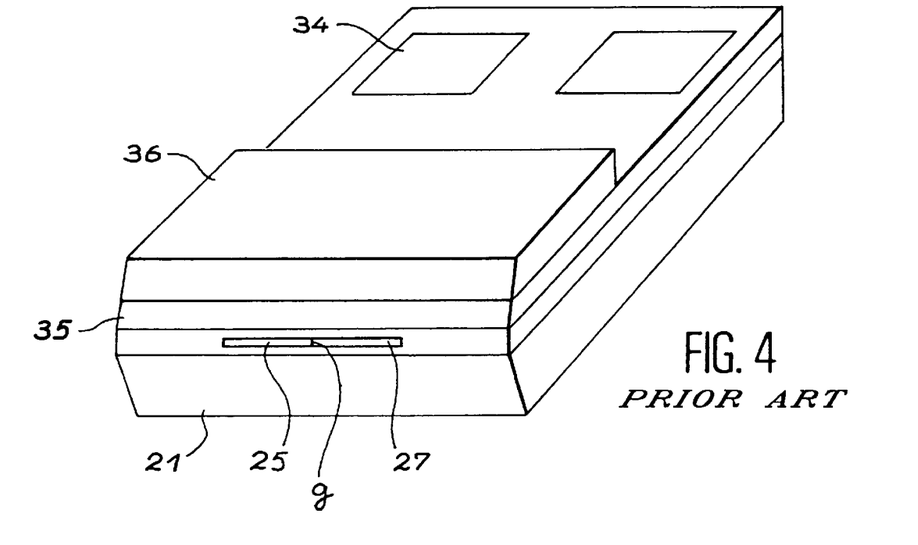
FIG. 4, already described, is another view of the preceding head.

FIG. 4 also shows the two front polar parts 25 and 27 separated by an air gap g. Also, an insulating layer 35 covering the entire unit and a protective layer 36 or superstrate complete the unit and make the contact surface symmetrical with the recording medium.

Figure 3:
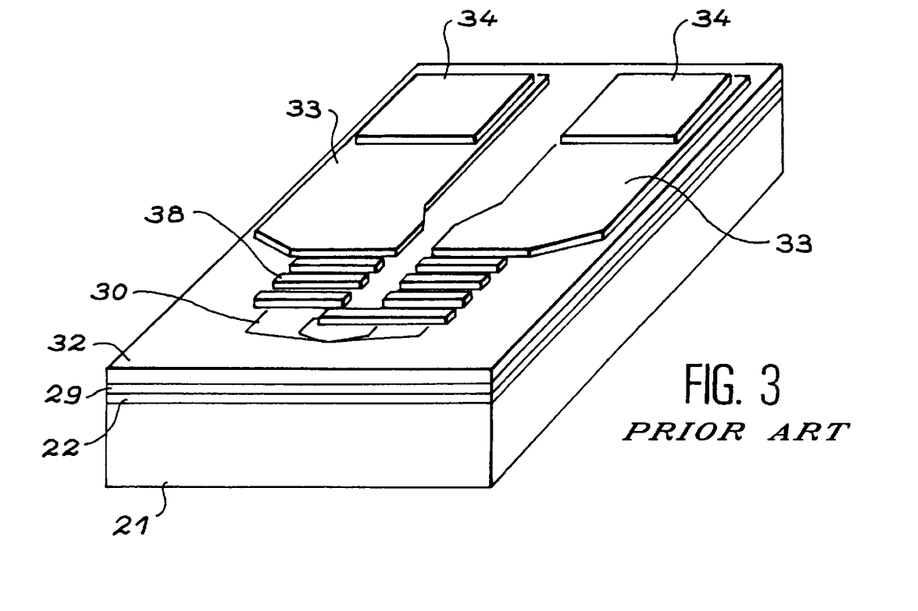
FIG. 3, already described, is a further illustration of a known magnetic head with solenoid winding.

Although satisfactory from certain viewpoints, this structure has the disadvantage of giving rise to a very large head thickness in the zone lying between substrate 21 and superstrate 36. Such thickness corresponds to the lower part of coil 38, polar parts 25, 27 and insulating layers 22, 29, 32, 35. This thickness may give rise to friction problems with the recording medium leading to problems of differential wear of the various materials. Moreover, this large thickness gives rise to a considerable risk of delamination or bulging owing to intrinsic constraints in the layers, constraints of thermal origin etc.

Also, the process for manufacturing a head in accordance with FIGS. 3 and 4 is hardly compatible with package processes, in particular for the production of the azimuth for the air gap using a diamond instrument, or for certain planarization stages of the insulators deposited on large thicknesses of metallic patterns, which leads to problems of step overlay with breaks on the edge of the patterns.

The purpose of the present invention is precisely to remedy such drawbacks.

DISCLOSURE OF THE INVENTION

For this purpose, the invention suggests integrating part of the coil winding into the substrate, namely the lower sheet of conductors. In practice, the lower sheet is placed in a chamber made in the substrate. In this way, the head thickness can be reduced and, correlatively, the problems described above come to be solved.

In precise manner, the purpose of the invention is a vertical magnetic head comprising a solid substrate, a magnetic circuit with at least one first and one second polar part placed side by side and separated by a nonmagnetic air gap, this magnetic circuit comprising at least one non-embedded part in the substrate, a conductor coil surrounding that part of the magnetic circuit which is not embedded in the substrate, this head being characterized in that the conductor coil is formed by a lower sheet of conductors placed in at least one chamber made in the substrate and by an upper sheet of conductors astride the non-embedded part.

According to a first embodiment, the magnetic circuit comprises a rear magnetic closing part and a first and second side magnetic part magnetically connected to the rear magnetic closing part and to the first and second polar parts respectively, the first and second side magnetic parts each forming a non-embedded part of the magnetic circuit, and characterized in that the conductor coil comprises at least one winding coiled around at least the first and/or second side magnetic parts, this winding comprising a lower sheet of conductors passing under the first and/or second side magnetic parts, this lower sheet being integrated into the substrate, and an upper sheet astride the first and/or second side polar parts.

The side magnetic parts are directly connected to the other components of the magnetic circuit (rear closing part and polar parts) or via an insulating layer of controlled thickness (for example $SiO_2$ or alumina 0.1 to 0.2 µm thick). The use of an insulating layer is preferable for high frequency operation.

Advantageously, the polar parts are also integrated into the substrate.

Still preferably, the rear magnetic closing part is also integrated into the substrate.

If the substrate is not in insulating material, either because it is conductive or semi-conductive, the integration of the lower sheet of conductors can be achieved by etching said chambers in the substrate, said chambers being filled with insulating material in which the conductors are subsequently fabricated. This is the case in particular for a silicone substrate.

In another embodiment, the magnetic circuit comprises a rear closing part forming the non-embedded part of the circuit, and the conductor coil comprises a winding coiled around this rear closing part, with a lower sheet of conductors passing under the rear closing part, this lower sheet being embedded in the substrate, and an upper sheet passing over the rear closing part.

Advantageously, the rear closing part is magnetically connected to the first and second polar parts, there being no side magnetic parts.

In this alternative, the first and second polar parts may be embedded in the substrate.

According to a further embodiment, the first and second polar parts form the part of the magnetic circuit that is not embedded in the substrate, and the conductor coil surrounds at least one of the said first and second polar parts, this conductor coil comprising a lower sheet of conductors passing under at least one of the polar parts and being embedded in the substrate, and an upper sheet of conductors astride at least one of the polar parts.

A further object of the present invention is a process for manufacturing a vertical magnetic head such as just described. This process consists of, on a solid substrate, forming a magnetic circuit with a first and second polar part placed side by side and separated by a nonmagnetic air gap, this magnetic circuit comprising at least one part non-embedded in the substrate, and of forming a conductor winding around the non-embedded part of the circuit, this process being characterized in that said conductor winding is formed by making a lower sheet of conductors in at least one chamber made in the substrate and passing under the non-embedded part, and by embedding this lower sheet in the substrate, and by forming an upper sheet of conductors astride the non-embedded part of the magnetic circuit.

The process of the invention comprises the methods of use corresponding to the modes of embodiment of the head (forming a magnetic circuit with only one rear closing part, or with no rear part).

DETAILED DESCRIPTION OF EMBODIMENTS

With reference to FIGS. 5 to 27 a description follows of a first embodiment of the magnetic head in of the invention.

Needless to say, the materials described and the sizes given are only given for explanatory purposes and are in no way restrictive.

Figure 5:
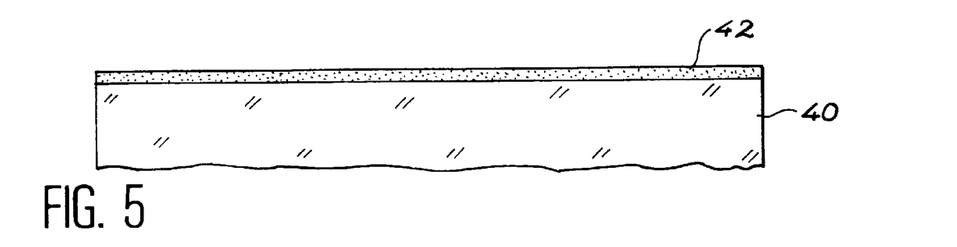
FIG. 5 shows the initial substrate in an example of the process of the invention.
Figure 6:
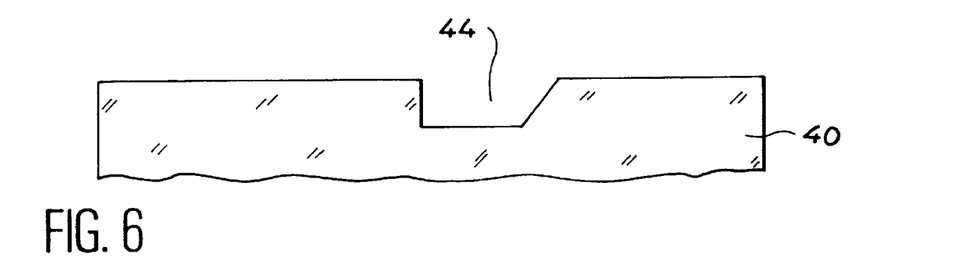
FIG. 6 gives a longitudinal section view of the production stage of a first chamber.

In the particular embodiment described, the starting point is a solid substrate in silicon 40, having a crystal orientation of <110> (FIG. 5). Any other crystal orientation may be used to vary the head azimuth. A layer of insulating material 42 in $SiO_2$ or $Si_3N_4$ is deposited on this substrate using the LPCVD method (Low Pressure Chemical Vapor Deposition). This insulating layer 42 may have a thickness of 40 nm (or 0.04 $\mu$m). Using a lithographic process, the shape of the first polar part is outlined and various reference marks made. Layer 42 is subsequently etched and anisotropic etching of the substrate is made for example using a KOH solution which produces a first chamber 44 (FIG. 6) of which one side is vertical in this case along the <111> silicon planes. Layer 42 which served as a mask is then removed.

Figure 7:
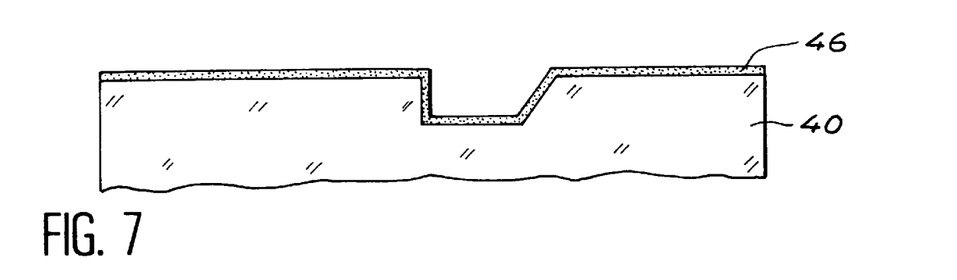
FIG. 7 shows the depositing stage of an insulating layer.
Figure 8:
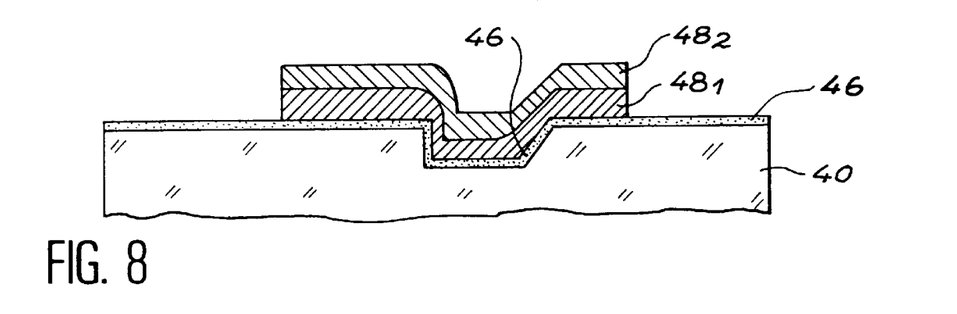
FIG. 8 is another longitudinal view of the growth stage of a dual magnetic layer.
Figure 9:
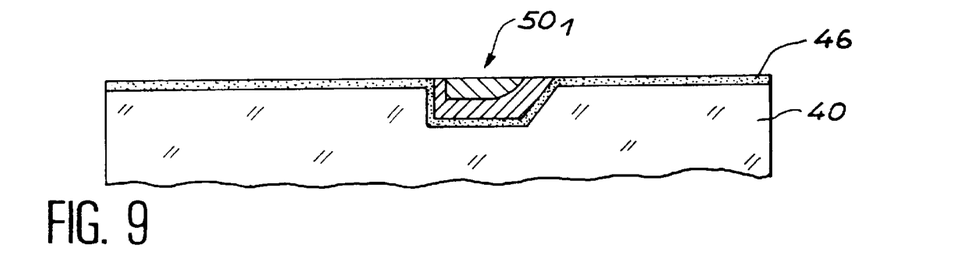
FIG. 9 gives a longitudinal view of the first polar part obtained.
Figure 10:
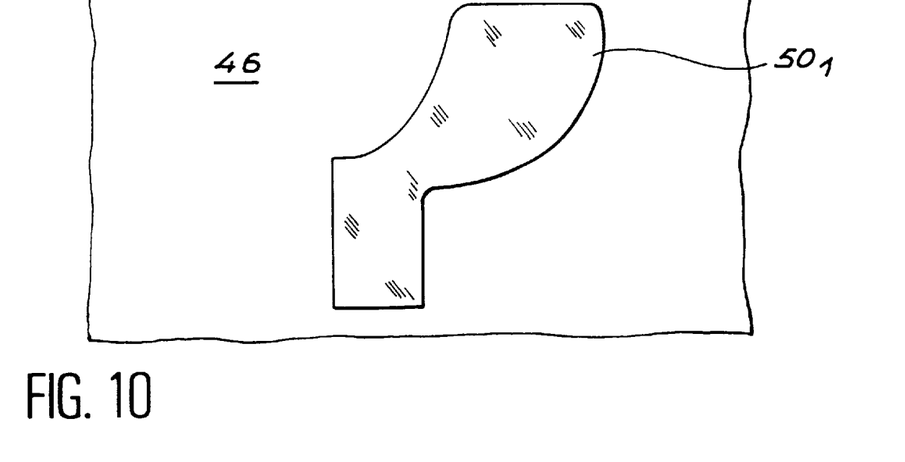
FIG. 10 shows the same first polar part as seen from above.
Figure 11:
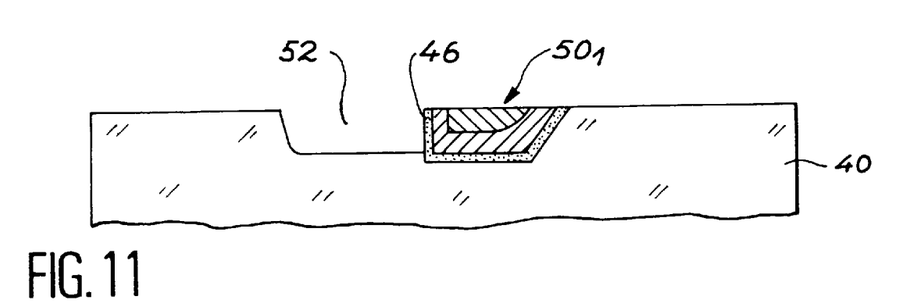
FIG. 11 shows the formation of a second chamber.
Figure 12:
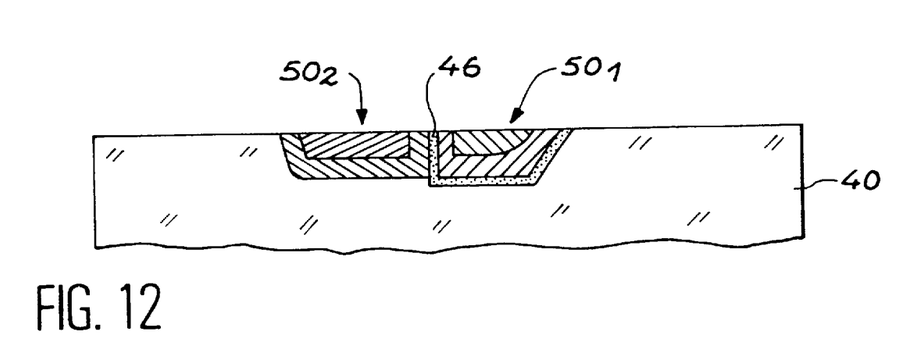
FIG. 12 gives a section view of a second polar part.

Thermal oxidization is then carried out to form a layer 46 of $SiO_2$ (FIG. 7). This layer may be 0.2 $\mu$m thick.

A magnetic material is then placed in the chamber. Electrolytic growth may be used for example. For this purpose, a conductive sub-layer is deposited by cathode sputtering, for example in NiFe with a thickness of 0.1 $\mu$m. Through a first lithographic process, a mask is formed for example in resin having an opening opposite the sub-layer placed on the bottom of the chamber. Electrolysis of NiFe is then carried out for example in a magnetic field to obtain a magnetic layer having magnetic domains oriented parallel to the air gap. The resin is then removed.

This may be conducted in two operations, so that an insulating layer and a conductor sub-layer may be positioned in between the two magnetic layers to improve high frequency performance. For example, for a total polar part thickness of 6 $\mu$m, two layers of NiFe can be made (including the conductor sub-layers of NiFe) each 3 $\mu$m thick, separated from an insulating layer of $SiO_2$ or $Si_3N_4$ or $Al_2O_3$ 0.1 $\mu$m thick. Two such magnetic layers are referenced 48$_1$ and 48$_2$ in FIG. 8.

Mechanical polishing is then carried out, stopping at layer 46 to obtain a first polar part 50$_1$. This part is shown in cross section in FIG. 9 and a top view is given in FIG. 10.

On the sub-unit obtained a second insulating layer is deposited, for example in $SiO_2$ having a thickness of 0.2 $\mu$m. An opening is outlined with lithography, and using the layer of $SiO_2$ obtained and the remainder of layer 46 as a mask, a second chamber 52 is etched out (FIG. 11) isotropically, for example using hyperfrequency plasma to obtain good selectivity in relation to the silicon oxide. By etching the second chamber 52, a rear chamber is etched out at the same time which is not seen in FIG. 11 but which will be seen in later Figures, in particular in FIG. 13. The mask and that part of layer 46 remaining on the surface are then removed and a magnetic material is deposited in the second chamber 52 and in the rear chamber. Electrolytic growth of NiFe may be used as previously, in one or two layers separated by an insulating layer.

Figure 13:
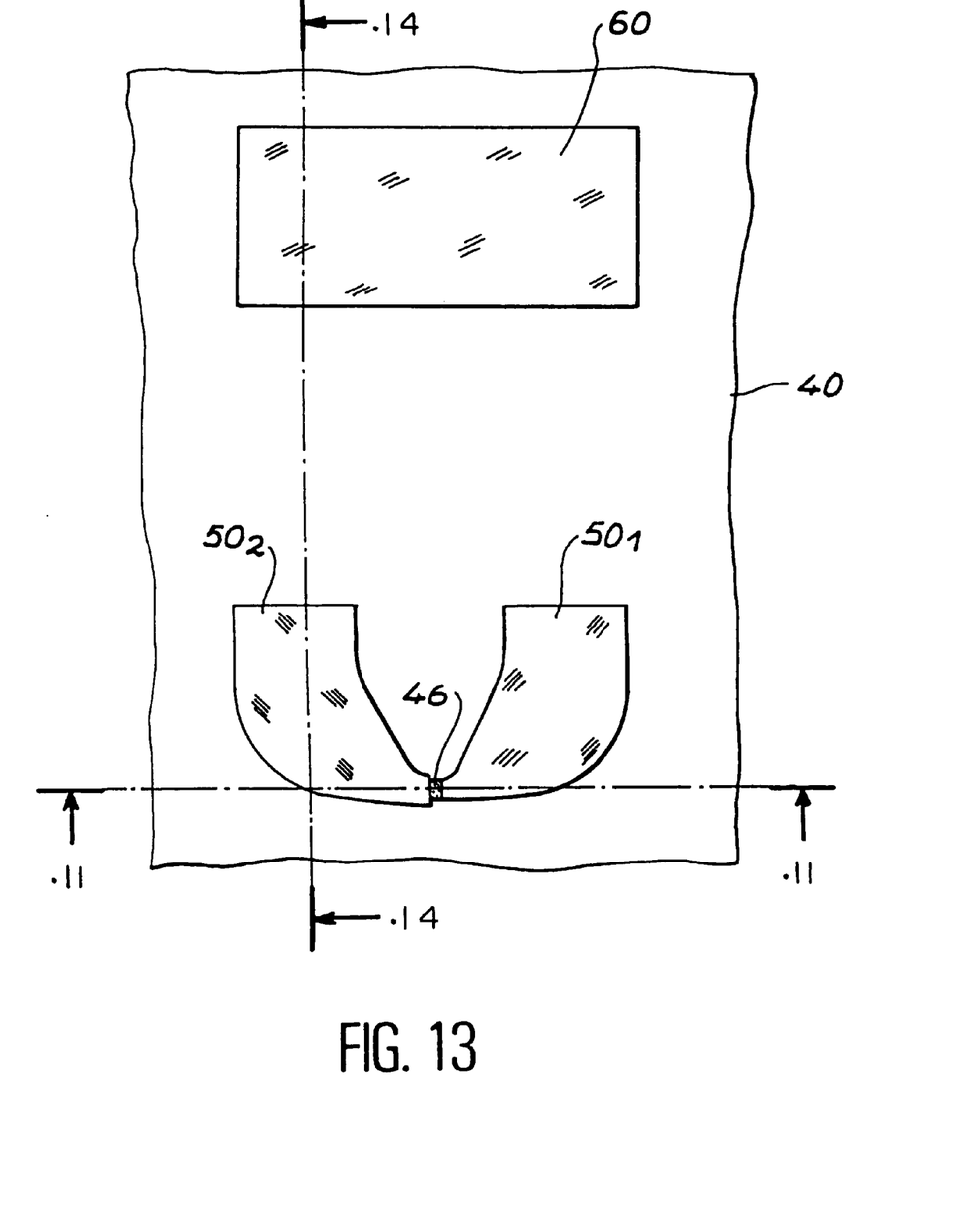
FIG. 13 shows a top view of both polar parts and the rear magnetic part.

This sub-unit is mechanically polished until the vertical part of insulating layer 46, which will form air gap 46, becomes visible. Both polar parts 50$_1$ and 50$_2$ are then obtained such as they are shown in cross section in FIG. 12. FIG. 13 is a top view of these same polar parts 50$_1$ and 50$_2$ separated by air gap 46, and also shows the rear magnetic part 60 which will serve to close the magnetic circuit.

With FIG. 13 it is also possible to illustrate the types of section which are used in the present description, namely a so-called longitudinal section along line AA passing through the polar parts, and a so-called cross section along line BB passing through one of the polar parts (in this case the second 50$_2$) and the rear magnetic closing part 60. The sections which have just been described are all longitudinal sections along AA. The following descriptions will all refer to cross sections following line BB.

Figure 14:
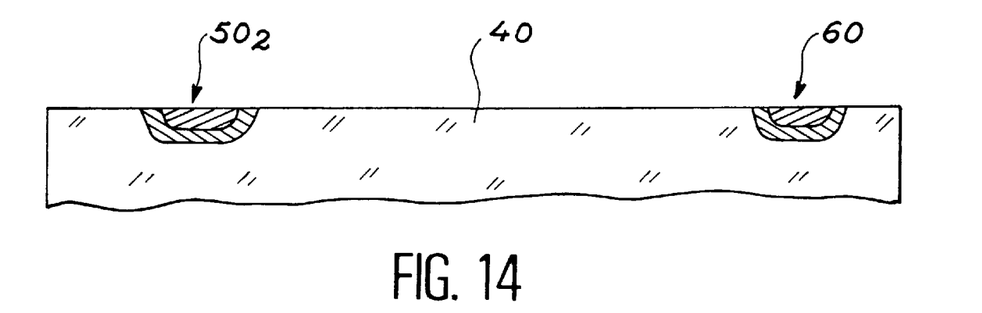
FIG. 14 gives a cross section view of one of the front polar parts and the rear magnetic closing part.

FIG. 14 therefore shows the cross section of the sub-unit obtained at this stage of the process with the second polar part 50$_2$ and the rear magnetic closing part 60.

Figure 15:
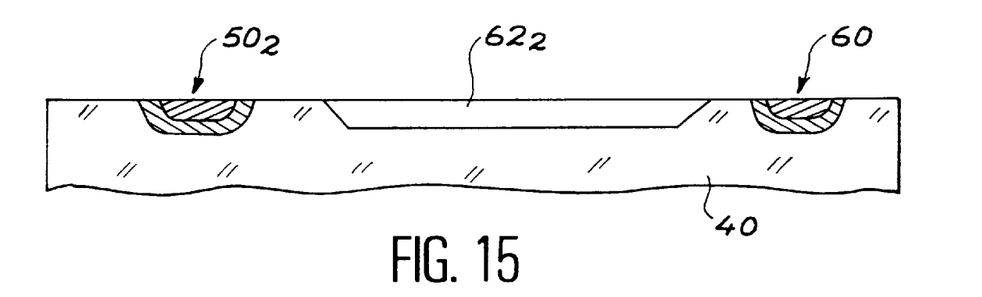
FIG. 15 illustrates the etching stage of a chamber for the lower sheet of conductors of the coil.

Subsequently (FIG. 15) two side chambers are fabricated between the polar parts and the rear magnetic closing part 60 (only chamber 62$_2$ is visible in the section shown in FIG. 15). Etching may be made in radiofrequency plasma mode. The depth of the chambers may be 4 $\mu$m for example.

Figure 16:
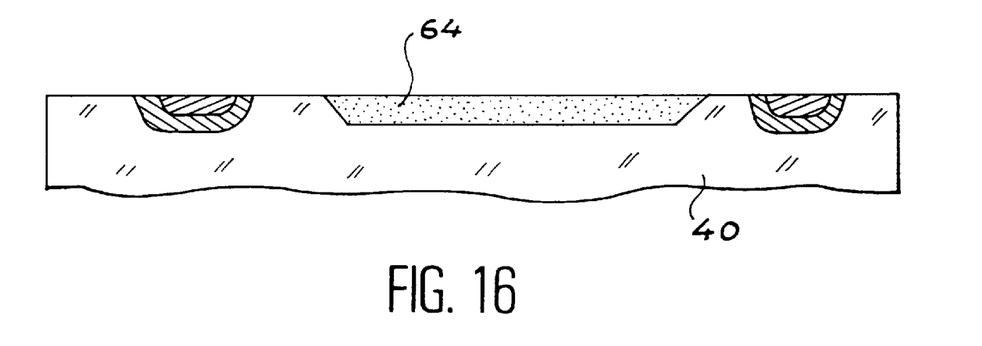
FIG. 16 shows the filling of a chamber with an electric insulator.

If the substrate is not insulating, which is the case in the described example in which the substrate is in silicon, an insulating material is subsequently deposited in the chambers, silica for example by PECVD (Plasma Enhanced Chemical Vapor Deposition) and the sub-unit is then polished, mechanically for example. This planarization may be preceded by a trimming operation made by etching to limit the amount of insulating surface to be planarized. FIG. 16 shows the planarized insulating material 64 filling the chamber.

Figure 17:
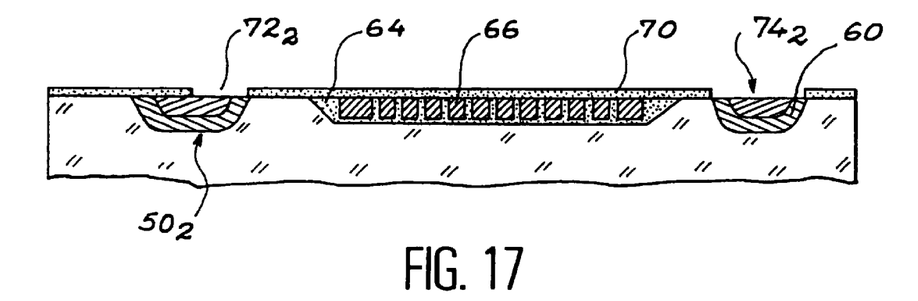
FIG. 17 gives a cross section view of the lower sheet of conductors and the mask for the magnetic contact lead.
Figure 18:
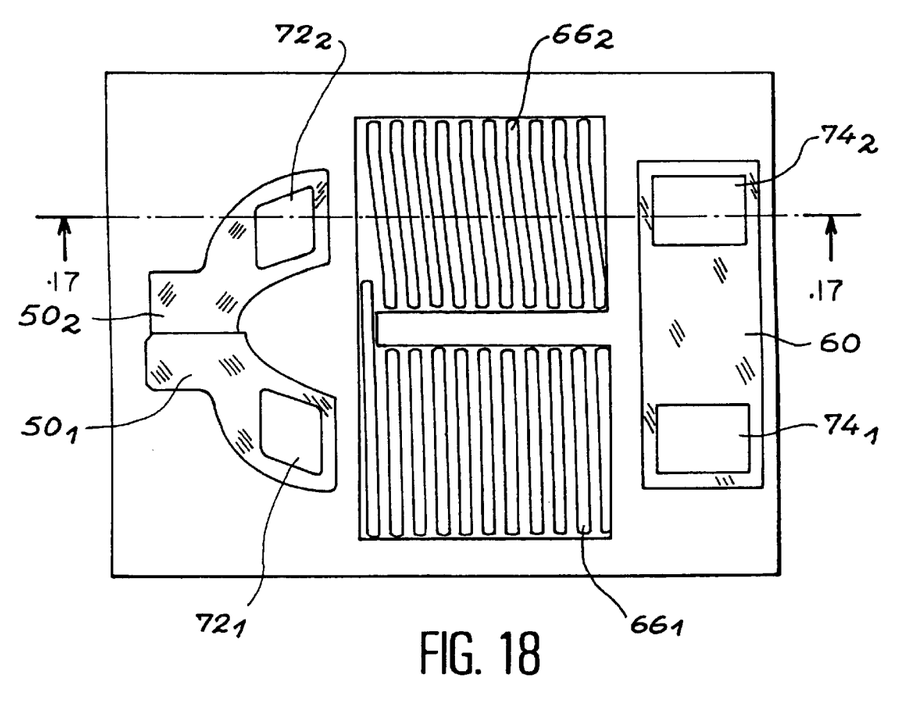
FIG. 18 shows the sub-unit obtained at this stage, as seen from above, with its two polar parts, rear magnetic closing part and lower sheet of conductors.
Figure 19:
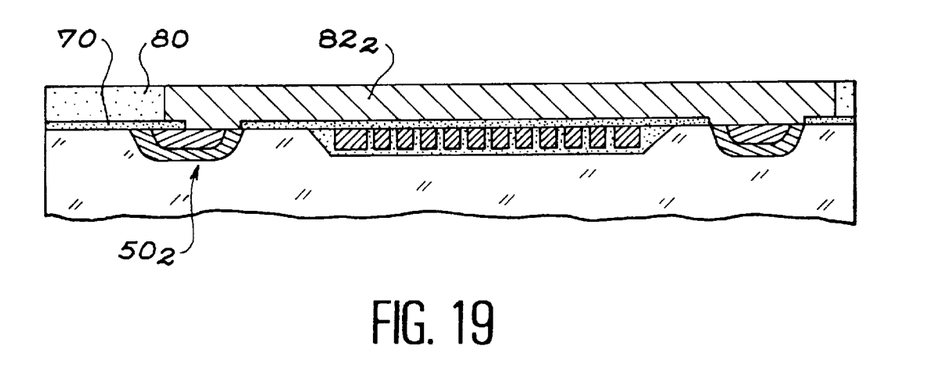
FIG. 19 gives a cross section view of a side magnetic part of the magnetic circuit.

In said insulating layer 64 parallel grooves are etched, for example by plasma etching, to a depth of 3 $\mu$m. A sub-layer of CrCu is then deposited by cathode sputtering for example, and using electrolysis the grooves are filled in for example with copper. FIG. 17 gives a cross section view of the conductors 66 obtained in these grooves. They form two lower sheets 66$_1$ and 66$_2$ visible in FIG. 18 which is a top view of the sub-unit. These two lower sheets extend between polar parts 50$_1$ and 50$_2$ and rear magnetic closing part 60.

The sub-unit is then covered with an insulating layer 70 that can be seen in FIG. 17, in $SiO_2$ for example, deposited by PECVD having a thickness of 1 $\mu$m. This layer is then etched, for example by plasma etching, to form openings 72$_1$, 72$_2$ above polar parts 74$_1$, 74$_2$ above the ends of the rear magnetic closing part 60. These openings are visible in the top view given in FIG. 18. Only openings 72$_2$ and 74$_2$ are shown in section BB of FIG. 17.

According to one alternative embodiment, an insulating stop layer, for example in $A_2O_3$, 0.2 $\mu$m thick, is deposited prior to insulating layer 70. This stop layer is exposed by etching layer 70 in openings 72$_1$, 72$_2$ and 74$_1$ and 74$_2$. This stop layer is maintained in the magnetic circuit.

Figure 20:
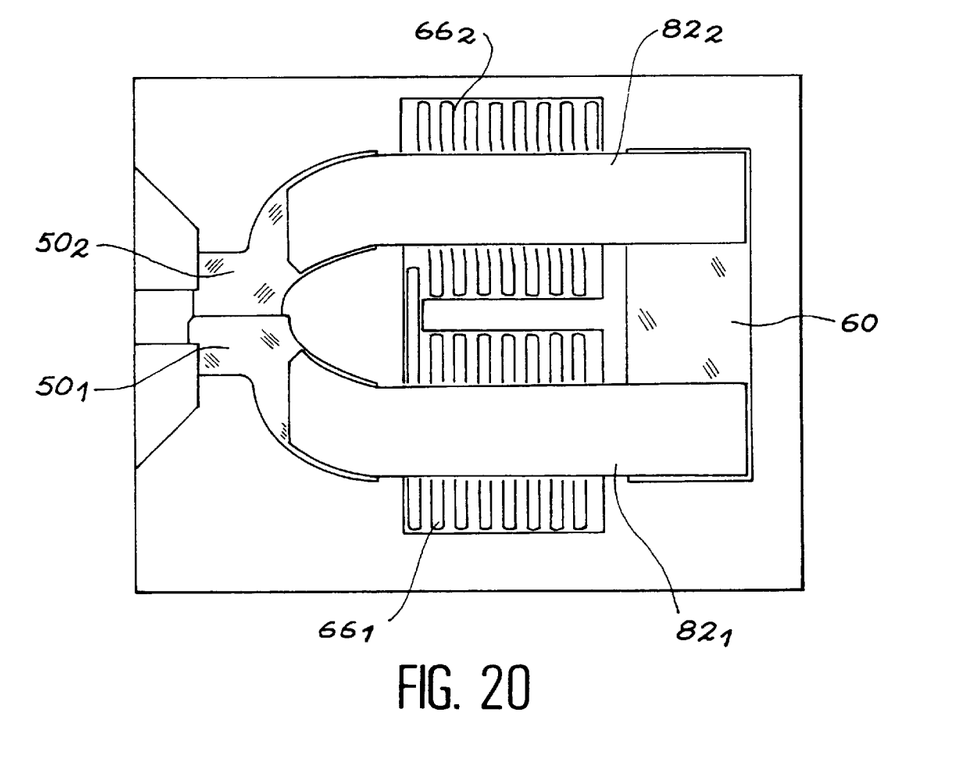
FIG. 20 gives a top view of the sub-unit obtained at this stage.
Figure 21:
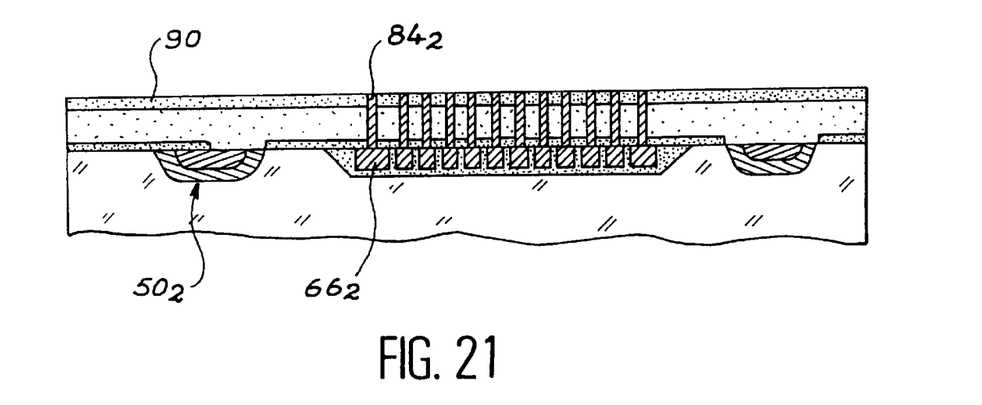
FIG. 21 is a cross section view of the production stage of the electric connection pads.

The process continues by fabricating the two magnetic side parts which will complete the magnetic circuit. First an insulating layer 80 (FIG. 19) having the same thickness as the future side magnetic parts, is deposited. For example a layer 3 $\mu$m thick of $SiO_2$ can be deposited by PECVD. This layer is etched in both zones in which the two magnetic parts are to be formed, namely over the lower conductor sheets 66$_1$, 66$_2$ already fabricated and over openings 72$_1$, 72$_2$ and 74$_1$, 74$_2$ already made. Using electrolysis a magnetic material 82$_1$, 82$_2$ is then deposited using operating methods that have already been described (FIG. 20). This material may possibly be wafered. For proper orientation of the magnetic domains, electrolysis may be conducted in a magnetic field, the direction of this field this time being perpendicular to the direction of the air gap.

The sub-unit obtained is illustrated seen from above in FIG. 20 in which the two side magnetic parts 82$_1$ and 82$_2$ can be seen respectively astride the two lower conductor sheets 66$_1$ and 66$_2$ and forming the junction between rear part 60 and the two polar parts 50$_1$ and 50$_2$.

Figure 22:
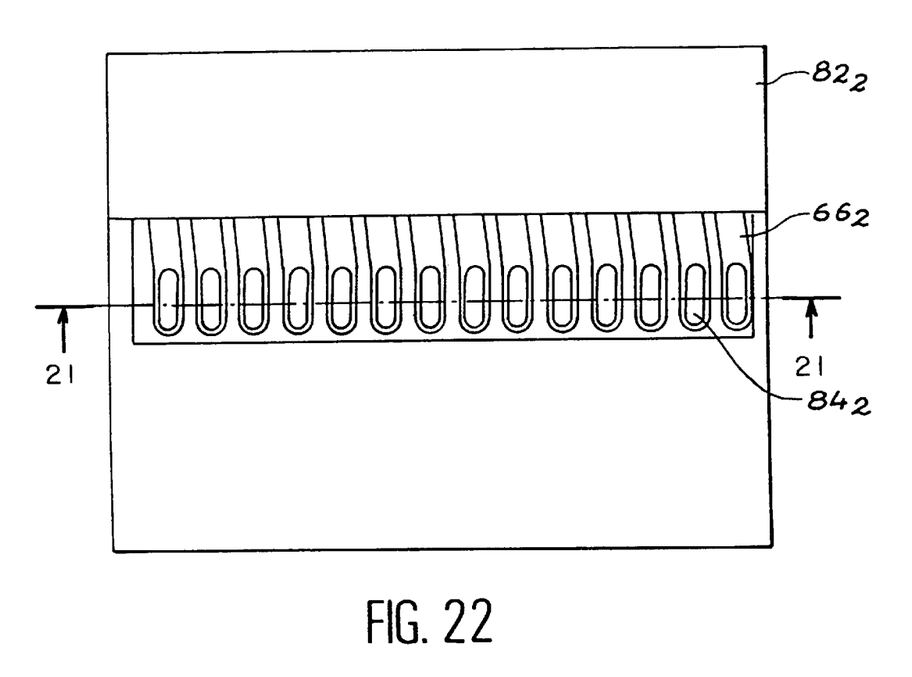
FIG. 22 is a close-up top view of these electric connection pads.

To complete the conductor winding, the process next includes formation of the electric connection pads. An insulating layer 90, for example in SiO$_2$, (FIG. 21) 1 $\mu$m thick is deposited using the PECVD method. Openings are etched in this layer at the side edges of the two lower sheets of conductors, etching being sufficiently deep to expose the ends of the conductors. In the example described up until now, it is therefore assumed that layer 90 is etched over its own height and that of layers 80 and 70, that is to say over 3+1+1=5 $\mu$m. The openings may be 4 $\mu$m wide, separated by a distance of 6 $\mu$m. Using the same electrolytic growth process, the openings made are filled with a metal, copper for example, to obtain electric connections $84_2$ which come to rest on the ends of the conductors of the two lower sheets $66_1$, $66_2$. FIG. 22 shows a top view of pads $84_2$ at the ends located along the inner side edge of side magnetic part $82_2$ which closes the circuit. Similar pads are made on the outer edge of the same sheet of conductors and on the other sheet.

Figure 23:
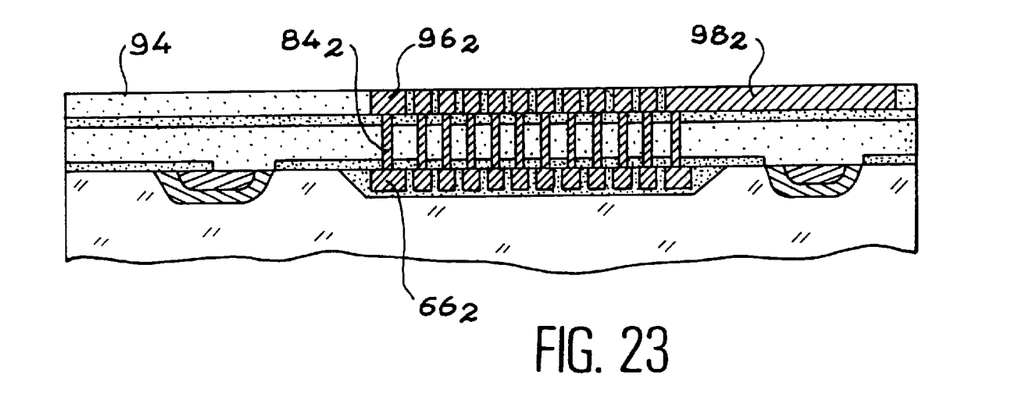
FIG. 23 is a cross section view of the production stage of the upper sheet of conductors.
Figure 24:
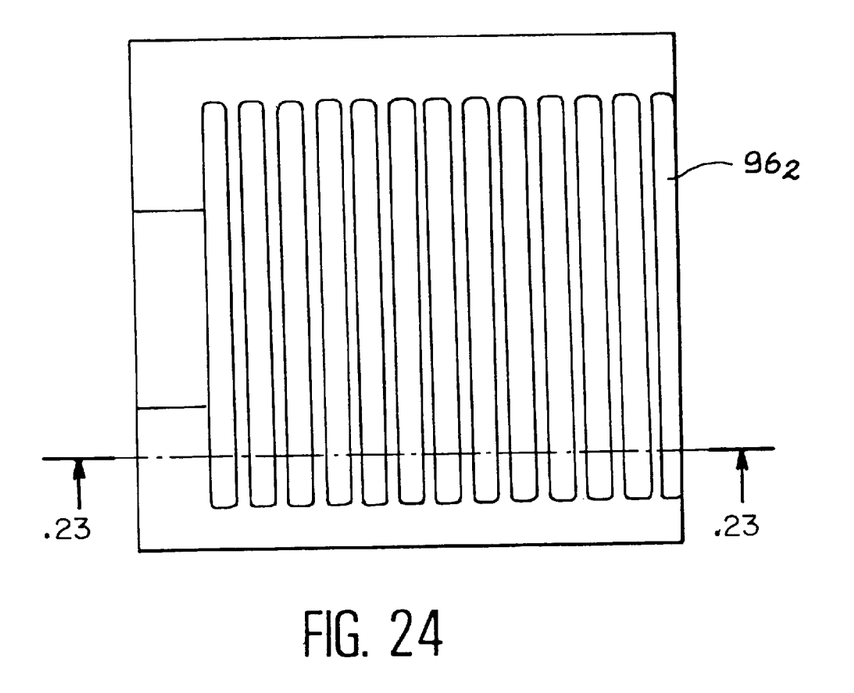
FIG. 24 is a close-up top view of these upper conductors.
Figure 25:
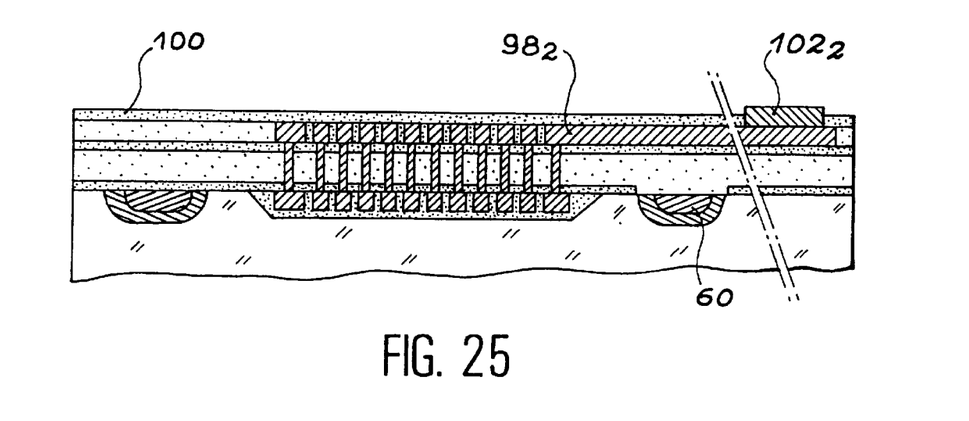
FIG. 25 is a section view of the production stage of the contact pads of the conductor coil.

An upper sheet of conductors is then made by depositing an insulating layer 94 having the same thickness as the thickness of the desired sheet (FIG. 23). For example, a 3 $\mu$m layer of SiO$_2$ is deposited by PECVD. Parallel grooves are etched, for example 8 $\mu$m wide and 2 $\mu$m apart. These grooves extend from one connection pad to another. Again using an electrolytic growth process, two upper sheets of conductors are formed which come to rest, at either end, on the electric connection pads closing together the two solenoids. FIG. 23 gives a BB section view of conductors $96_2$ at connection pads $84_2$ and, in FIG. 24 the complete sheet is shown as seen from above.

During this operation, the conductor material is also deposited which will be used to form connections $98_1$, $98_2$ to connect the ends of the coil to future contact pads. A top view of these conductors can be seen in FIG. 26. A section view of conductor $98_2$ can be seen in FIG. 23.

In this manner a dual winding has been made with two lower sheets passing under the side magnetic parts and integrated into the substrate, two upper sheets passing over the side magnetic parts, and connection pads connecting one conductor of one lower sheet to the corresponding conductor of the upper sheet. Needless to say, for these two windings to be correctly positioned the sheet conductors must be slightly tilted so that the end of one lower conductor is placed opposite one end of an upper conductor, whose other end is placed opposite the end of the lower conductor adjacent to the first.

Figure 26:
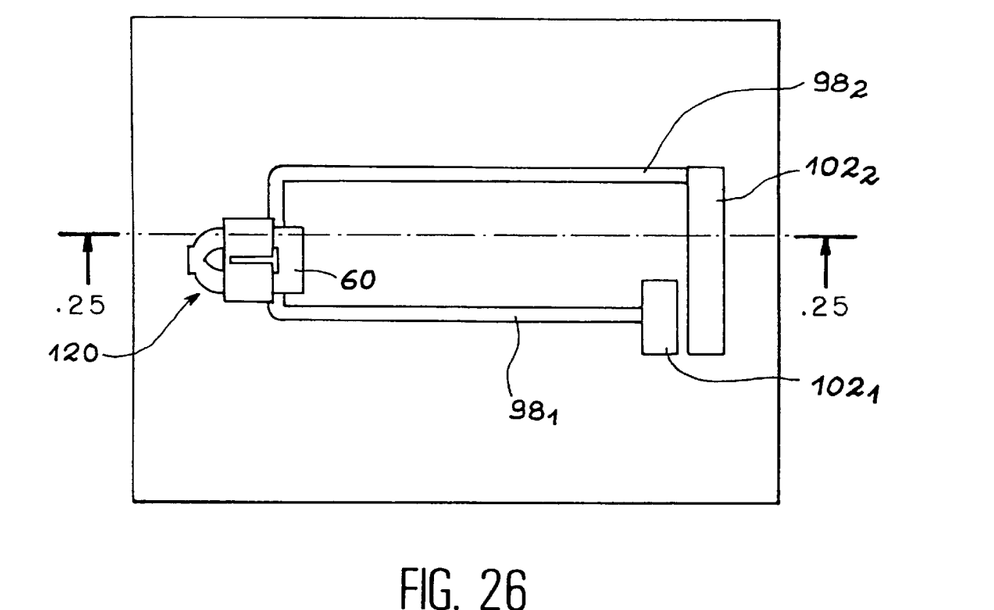
FIG. 26 is a top view of the head obtained in accordance with this embodiment.

The remaining stage is to make the contact pads providing access to the coil. An insulating layer 100 is deposited on the whole unit (FIG. 25) having the same thickness as the thickness of the desired pad. For example 1 $\mu$m of SiO$_2$ is deposited by PECVD. This insulating layer is etched to expose the end of connections $98_1$, $98_2$ and pads $102_1$, $102_2$ are made, in gold for example, which has good welding properties for the future connection wires. Advantageously, pads $102_1$ and $102_2$ are made by electrolysis using a previously deposited conductive sub-layer. As sub-layer alloys of CrAu, CrCu and even FeNi may be used. A top view of connections $98_1$, $98_2$ and contact pads $102_1$, $102_2$ is given in FIG. 26, and a BB section view of connection $98_2$ and pad $102_2$ is given in FIG. 25. FIG. 26 is on a smaller scale than the previous Figures to show the entire head with its active part referenced 120 and its outlet connections.

Over the unit thus obtained a superstrate may possibly be added, in silicon for example, to give symmetry to the contact zone in relation to the recording medium. This superstrate must not of course mask the contact pads.

It is of interest to compare known structures described in the introduction with the structure of the invention. For example, the thickness of the materials contained between the substrate and the superstrate are:
  i) for a head of the prior art such as described in EP-A-0 467 263: lower coiling in 5 $\mu$m of insulator, polar part 6 $\mu$m, upper coiling and pads in 5 $\mu$m of insulator, i.e. a total insulator thickness of 16 $\mu$m;
  ii) for a head of the invention: magnetic circuit closed in 4 $\mu$m of insulator, upper coiling and pads in 5 $\mu$m of insulator, i.e. a total insulator thickness of 9 $\mu$m.

The gain in thickness is therefore evident. The problems of friction, differential wear, intrinsic and thermal constraints in the insulating layers are consequently far easier to solve in the invention than in the prior art.

Figure 27:
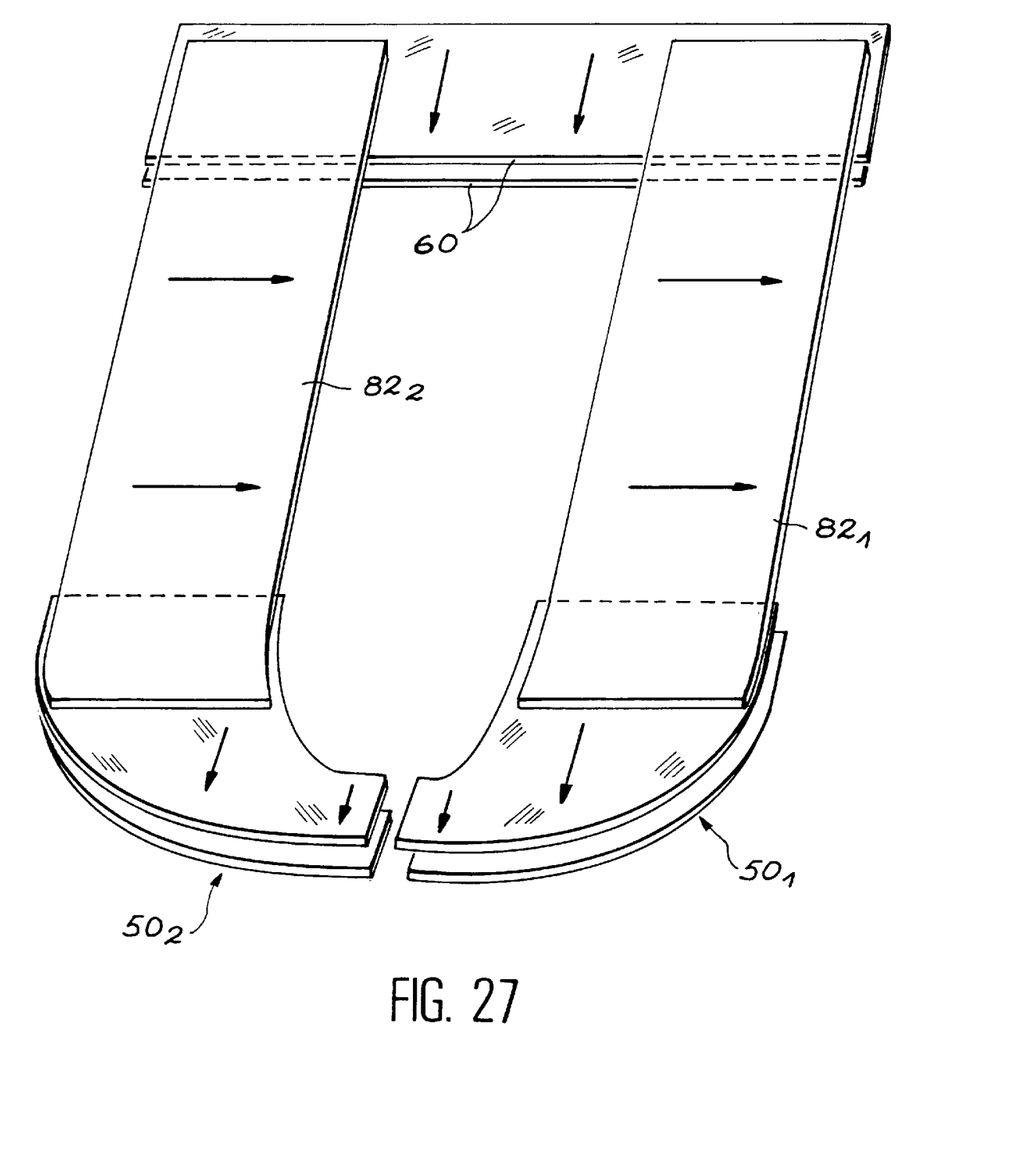
FIG. 27 illustrates an alternative with cross orientation of magnetization.

The efficiency and performance at high frequency of the magnetic head which has just been described can be further increased by taking advantage of the magnetic anisotropy, and in particular of the orientation of the domains as shown in FIG. 27. In this Figure, only the magnetic parts of the head are shown, namely polar parts $50_1$, $50_2$ assumed to be made in two layers, side parts $82_1$, $82_2$ and the rear closing part 60 also assumed to be made in two layers. The arrows indicate the orientation of magnetization. In polar parts $50_1$ and $50_2$ and in rear closing part 60 this orientation is parallel to the air gap, whereas in side parts $82_1$, $82_2$ this orientation follows the axis of easy magnetization, which is perpendicular to the air gap.

Figure 28:
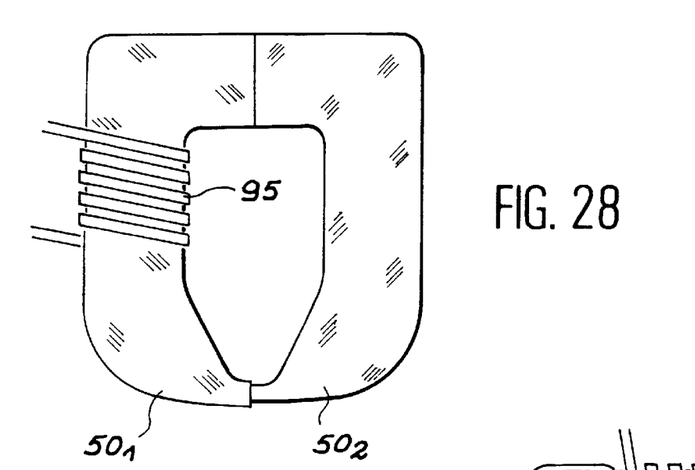
FIG. 28 illustrates another embodiment in which the magnetic circuit only comprises two non-integrated polar parts with a winding coiled around one of the polar parts.
Figure 29:
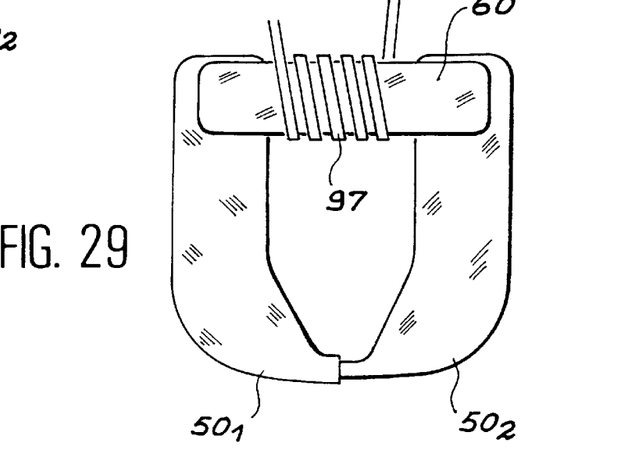
FIG. 29 illustrates a further embodiment in which the magnetic circuit comprises two polar parts and a non-integrated rear closing part, the winding being coiled around this rear closing part.
Figure 30:
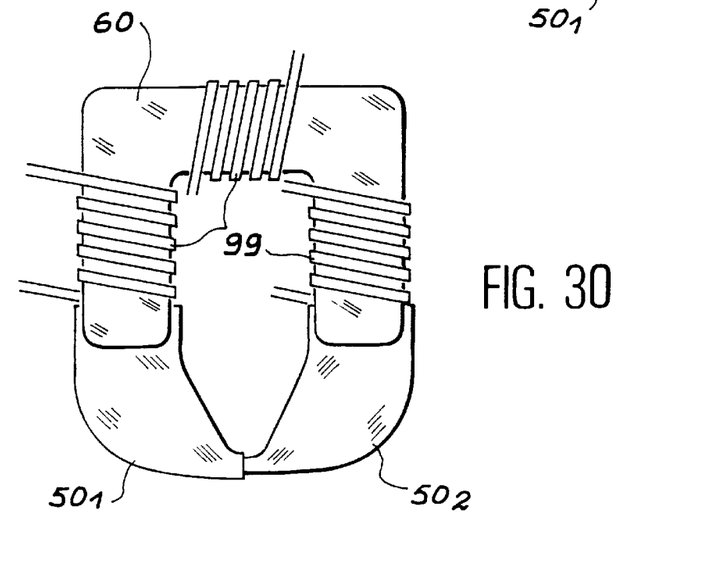
FIG. 30 illustrates the same embodiment but with a different shaped rear closing part.

In the embodiment which has just been described, the magnetic circuit comprises two polar parts, two side parts and a rear magnetic closing part. The invention is not, however, restricted to this embodiment. On the contrary, it extends to heads having only two polar parts with no side parts and no rear closing part, or having only two polar parts and one rear closing part. FIGS. 28, 29 and 30 illustrate some of these possibilities.

FIG. 28 gives a diagram of a magnetic head which only comprises two polar parts $50_1$, $50_2$ and a winding 95 around one of these parts ($50_1$). Evidently, it is possible to use another winding on the other polar part ($50_2$). In this (or these) windings, the lower sheet of conductors is integrated into the substrate.

In this embodiment, the polar parts are not integrated into the substrate.

FIG. 29 illustrates another embodiment in which the magnetic circuit comprises two polar parts $50_1$, $50_2$ which may or may not be integrated into the substrate, and a rear magnetic closing part 60 that is not integrated into the substrate. It is around this rear part that coil 97 is wound with a lower sheet of conductors integrated into the substrate.

In this FIG. 29, the rear magnetic closing part 60 is straight, but in FIG. 30 it is horse-shoe shaped. Winding 99 is coiled here around the three stems of the rear part again with a lower sheet conductors integrated into the substrate.

Other embodiments can be imagined that come within the limits of this invention, provided that the head comprises two polar parts and at least one part which is not embedded, the coil being wound around this part and having its lower sheet of conductors integrated into the substrate.

What is claimed is:

1. Vertical magnetic head comprising a solid substrate, a magnetic circuit with at least a first and a second polar part having embedded portions positioned side by side and separated by a nonmagnetic air gap the magnetic circuit comprising at least one non-embedded bridging part with no portion of there of embedded in the substrate, a conductor coil surrounding the non-embedded part, wherein the conductor coil is formed by a lower sheet of conductors placed in at least one chamber made in the substrate, underneath the non-embedded bridging part, the lower sheet being integrated in the substrate, and an upper sheet of conductors astride the non-embedded bridging part.

2. Magnetic head in accordance with claim 1, wherein the magnetic circuit comprises a rear magnetic closing part and a first and second side magnetic part magnetically connected to the rear magnetic closing part and to the first and second polar parts respectively, the first and second side magnetic parts each forming the non-embedded bridging part of the magnetic circuit, no portion of said bridging part being embedded in the substrate, and wherein the conductor coil comprises at least one winding coiled around at least one of the first and second side magnetic parts, the winding comprising the lower sheet of conductors passing underneath the at least one of the first and second side magnetic parts, the lower sheet being integrated in the substrate, and the upper sheet astride the at least one of the first and second side magnetic parts.

3. Magnetic head in accordance with claim 1, wherein the substrate is semiconductive or conductive, the lower sheet of conductors is placed in the at least one chamber etched in the substrate and filled with an insulating material, the conductors of the lower sheet being formed in the insulating material.

4. Magnetic head in accordance with claim 2, wherein the first and second polar parts are integrated in the substrate and are placed in a first and second chamber etched in the substrate.

5. Magnetic head in accordance with claim 2, wherein the rear magnetic closing part is also integrated in the substrate and placed in a chamber etched in the substrate.

6. Magnetic head in accordance with claim 1, wherein the magnetic circuit comprises a rear closing part forming the non-embedded bridging part of the circuit, and the conductor coil comprises a winding coiled around the rear closing part, with the lower sheet of conductors passing under the rear closing part, the lower sheet being embedded in the substrate and the upper sheet astride the rear closing part.

7. Magnetic head in accordance with claim 6, wherein the rear closing part is magnetically connected to the first and second polar parts.

8. Magnetic head in accordance with claim 7, wherein the first and second polar parts are embedded in the substrate.

9. Process for manufacturing a vertical magnetic head, comprising:

on a solid substrate, forming a magnetic circuit with a first and second polar part having embedded portions embedded in the substrate positioned side by side and separated by a nonmagnetic air gap, and at least one non-embedded bridging part with no portion there of embedded in the substrate; and forming a conductor coil around the non-embedded part of the circuit, including making a lower sheet of conductors passing underneath the non-embedded bridge part, embedding the lower sheet in at least one chamber made in the substrate, and making an upper sheet of conductors astride the non-embedded bridging part of the magnetic circuit.

10. Process in accordance with claim 9, wherein said step of forming the magnetic circuit further comprises:

forming a rear magnetic closing part and a first and second side magnetic part as the non-embedded bridging part magnetically connected to the rear magnetic closing part and to the first and second polar parts respectively, and wherein said step of forming the conductor coil includes making at least one winding coiled around at least one of the first and second side magnetic parts, the winding being obtained by making firstly the lower sheet of conductors passing underneath the at least one of the first and second side magnetic parts, the lower sheet of conductors being integrated in the substrate, and secondly the upper sheet of conductors astride the at least one of the first and second side magnetic part.

11. Process in accordance with claim 9, wherein the substrate is semiconductive or conductive, wherein said step of forming the conductor coil comprises, etching the least one chamber in the substrate, filling the at least one chamber with an insulating material, and forming the conductors of the lower layer in the insulating material.

12. Process in accordance with claim 11, wherein the first and second polar parts are also integrated into fit substrate by etching a first and second chamber in the substrate.

13. Process in accordance with claim 11, wherein the rear magnetic closing part is integrated into the substrate by placing the rear magnetic closing part in a chamber etched in the substrate.

14. Process for manufacturing a magnetic head in accordance with claim 9, wherein the step of forming the magnetic circuit comprises forming a rear closing part as the non-embedded bridging part on the substrate, and the step of forming the conductor coil comprises forming the conductor coil around the rear closing part by making the lower sheet of conductors passing underneath the rear closing part, the lower sheet being embedded in the substrate; and making the upper sheet astride the rear closing part.

15. Process in accordance with claim 14, further comprising placing the rear closing part in magnetic contact with the first and second polar parts.

16. Process in accordance with claim 15, wherein the first and second polar parts are integrated in the substrate.

* * * * *